United States Patent
Piedrahita Herran et al.

(10) Patent No.: US 12,267,338 B2
(45) Date of Patent: *Apr. 1, 2025

(54) EVENT EVALUATION PIPELINE FOR ALERT ENGINE

(71) Applicant: Absolute Software Corporation, Vancouver (CA)

(72) Inventors: Tomas Piedrahita Herran, Vancouver (CA); Hansel D'Ornellas, Surrey (CA)

(73) Assignee: Absolute Software Corporation, Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/117,770

(22) Filed: Mar. 6, 2023

(65) Prior Publication Data
US 2024/0039930 A1 Feb. 1, 2024

Related U.S. Application Data

(63) Continuation of application No. 17/380,857, filed on Jul. 20, 2021, now Pat. No. 11,601,449.

(60) Provisional application No. 63/054,548, filed on Jul. 21, 2020.

(51) Int. Cl.
*H04L 9/40* (2022.01)
*G06F 16/93* (2019.01)

(52) U.S. Cl.
CPC .......... *H04L 63/1416* (2013.01); *G06F 16/93* (2019.01); *H04L 63/1466* (2013.01); *H04L 63/20* (2013.01)

(58) Field of Classification Search
CPC .. H04L 63/1416; H04L 63/1466; H04L 63/20
USPC .......................................................... 726/22
See application file for complete search history.

(56) References Cited

U.S. PATENT DOCUMENTS

| | | | |
|---|---|---|---|
| 8,370,931 B1 * | 2/2013 | Chien | G06F 21/566 709/224 |
| 8,392,385 B2 | 3/2013 | Carey | |
| 8,966,501 B2 | 2/2015 | Roll | |
| 9,052,971 B2 | 6/2015 | Frank | |
| 9,571,508 B2 | 2/2017 | Singla | |
| 10,013,318 B2 | 7/2018 | Block | |
| 10,148,677 B2 | 12/2018 | Muddu | |

(Continued)

OTHER PUBLICATIONS

Rob Block, Deep Dive Into ArcSight ESM Rules, Sep. 2009, ArcSight, Inc.

*Primary Examiner* — Teshome Hailu
(74) *Attorney, Agent, or Firm* — Laurie Wright; Christopher N. Hunter; Blake, Cassels & Graydon LLP

(57) ABSTRACT

Provided is a way of evaluating rules/conditions that span different domain entities against a set of disparate events from multiple sources that have occurred within a specific window or interval of time from the current time back to a specific time in the past. Events are stored in dedicated storage to enable an extended window of time to be used for multiple event evaluation. Only relevant event/rule pairs are evaluated. The system will record when an event relevant to a rule happens. When a second event that is relevant to the rule happens, the system checks the records to see if a previous relevant event had happened in the past that would cause the rule to trigger an alert. A mechanism is also provided for evaluating static state in combination with changed properties.

2 Claims, 5 Drawing Sheets

(56) References Cited

U.S. PATENT DOCUMENTS

| | | | |
|---|---|---|---|
| 2005/0060562 A1* | 3/2005 | Bhattacharya | H04L 63/1416 |
| | | | 726/26 |
| 2013/0263209 A1* | 10/2013 | Panuganty | H04L 41/5025 |
| | | | 709/224 |
| 2018/0107530 A1 | 4/2018 | Gupta | |
| 2018/0336477 A1* | 11/2018 | Kashiwagi | G06F 15/76 |
| 2019/0036978 A1* | 1/2019 | Shulman-Peleg | G06F 21/53 |
| 2019/0356654 A1* | 11/2019 | Tebben | G06F 16/245 |

* cited by examiner

EVENT EVALUATION PIPELINE FOR ALERT ENGINE

CROSS REFERENCE TO RELATED APPLICATIONS AND CLAIM OF PRIORITY

The present application is a continuation of U.S. application Ser. No. 17/380,857, filed Jul. 20, 2021, which claims priority to U.S. Provisional Application No. 63/054,548, filed Jul. 21, 2020, the contents of which are all incorporated herein by reference in their entireties.

TECHNICAL FIELD

The present disclosure relates to evaluating events against rules for the purpose of taking a security action. In particular, it relates to pre-filtering multiple events before they are processed against the rules.

BACKGROUND

Some rules engine patterns are for when a system collects all the relevant data and then runs it through a rules engine. The rules engine is already configured with one or more rules against which the data is evaluated at a particular point in time. This does not satisfy use cases in which the system reacts to events that are happening in real time.

Complex event processing (CEP) engines are an evolution of the previously mentioned pattern of rules engine. They are designed to apply multiple rules against a single event when it occurs. Some complex event processing engine patterns have the capability of evaluating multiple events within a window of time. In typical CEP engines, the window of time tends to be small due to constraints on memory. Our requirement requires intervals of the order of several days.

Stream window approaches are those in which events remain in a queue and the system provides the capability of evaluating events held in the queue, before they are dequeued and used by a consumer processor. Some CEP solutions are based on a streaming CEP engine, such as Apache Flink™, KSQL Streaming for Kafka™, and Spark™, which at the time had micro-batching. However, these provide generalized frameworks rather than ready-made solutions. Most of the existing CEP solutions use the stream source to evaluate the window function. If interruption should occur, the context could be lost for evaluating an event against a condition. For non-durable streams, the information would be lost if the processes that run as part of the system should stop. This may be for any reason such as a crash or a server hardware problem. In this case, it would not be possible to query after such a stop. If, however, the stream is durable (persistent), then the problem is often that longer windows of time cause a significant increase in memory requirements, making them less efficient.

A downside of a window function implementation is the size of the queue and its impact on performance, particularly if the window function has a large interval. For example, if there are N entities (devices) producing M events each within the parameters of the window function, then that would be M×N events in the queue that will be evaluated with K rulesets, but the number of events that will fulfill the rules may only be Z<<MN, or even Z<<N.

SUMMARY

The evaluation pipeline disclosed herein is designed to overcome several challenges. It provides a mechanism in which only relevant event/rule pairs are evaluated. It provides a way of applying rules and their conditions, made by tenants that span different domain entities, to a set of disparate events from multiple sources that have occurred within a specific window or interval of time from the current time back to a specific time in the past. The solution disclosed is also scalable.

The basics of the rules engine disclosed herein is that it records when an event occurs at the tenant level that is relevant to the rule that the tenant has created. When a second event at the tenant level occurs that is relevant to a tenant-created rule, the system checks the records to see if a previous relevant event had happened in the past that would cause the rule to trigger. Once a rule triggers, the system will run all actions that the tenant has configured for that rule.

A mechanism is also provided for evaluating static state of an endpoint in combination with changed properties. The rules are made up of both event conditions that must happen within a period of time and state conditions that limit which events are considered for the rule. Compared to prior implementations that queue events using a window function, in which the number of events that fulfill the rules may only be Z<<N, the presently disclosed implementation reduces the size complexity of this, by storing only the matched event and rule condition tuple. The size of the queue in the present implementation is much lower (e.g. N, which would be on average 1 event stored per device, rather than NM). This allows us to have much larger window function intervals without a large negative impact on performance.

A method for filtering events related to an electronic device prior to evaluation of a group of multiple events thereof, the method comprising: storing a set of rules, each rule labeled with a rule type; receiving a stream of events, each event labeled with an event type; determining that the event type of one of the events matches the rule type of one of the rules; determining that a condition of said one rule is satisfied by said one event; creating a document; writing, in the document, said one event, said one rule, an indication that the condition is satisfied and an expiry time that is measured from said one event, wherein said one rule requires (a) the event type of another of the events to match the rule type of said one rule type, (b) the other event occur within the expiry time and (c) the other event to satisfy another condition of said one rule; storing the document in a non-volatile storage; determining that the event type of a second one of the events matches the rule type of said one rule; determining that the expiry time has not passed; determining that a second condition of said one rule is satisfied by said second event; writing said second event and an indication that the second condition is satisfied in the document; and taking a security action related to the electronic device.

Also disclosed is a system for filtering events related to an electronic device prior to evaluation of a group of multiple events thereof, the system comprising a server and non-transitory computer readable memory in the server storing computer-readable instructions, which, when executed by one or more processors in the server cause the server to: store a set of rules, each rule labeled with a rule type; receive a stream of events, each event labeled with an event type; determine that the event type of one of the events matches the rule type of one of the rules; determine that a condition of said one rule is satisfied by said one event; create a document; write, in the document, said one event, said one rule, an indication that the condition is satisfied and an expiry time that is measured from said one event, wherein said one rule requires (a) the event type of another of the events to match the rule type of said one rule type, (b) the other event occur within the expiry time and (c) the other event to satisfy another condition of said one rule; store the document in a non-volatile storage; determine that the event type of a second one of the events matches the rule type of said one rule; determine that the expiry time has not passed; determine that a second condition of said one rule is satisfied by said second event; write said second event and an indication that the second condition is satisfied in the document; and take a security action related to the electronic device.

Further disclosed is a method for evaluating events related to an electronic device, the method comprising: receiving a stream of pre-filtered events each of which is matched with a corresponding rule; determining that a first of the events satisfies a condition of its corresponding rule; creating a document that includes said first event, an indication of its corresponding rule, and an expiry time measured from said first event; determining that a second of the events satisfies another condition of the rule corresponding to said first event before the expiry time; adding said second event to the document and an indication that said other condition is satisfied; and taking a security action in relation to the electronic device.

Still further disclosed is a method for evaluating events related to an electronic device, the method comprising: analyzing a stream of pre-filtered events until a first of said events satisfies a condition of a rule corresponding to said first event; creating a document that includes said first event, an identification of the rule, and an expiry time defined in the rule and measured from said first event; continuing to analyze said events until either (a) a second of the events satisfies another condition of the rule before the expiry time or (b) the expiry time has passed; in the case of (a), adding said second event to the document and an indication that said other condition is satisfied, taking a security action in relation to the electronic device, and deleting the document; in the case of (b), deleting the document and repeating the method with subsequent pre-filtered events.

DETAILED DESCRIPTION

A. Glossary

Figure 1:
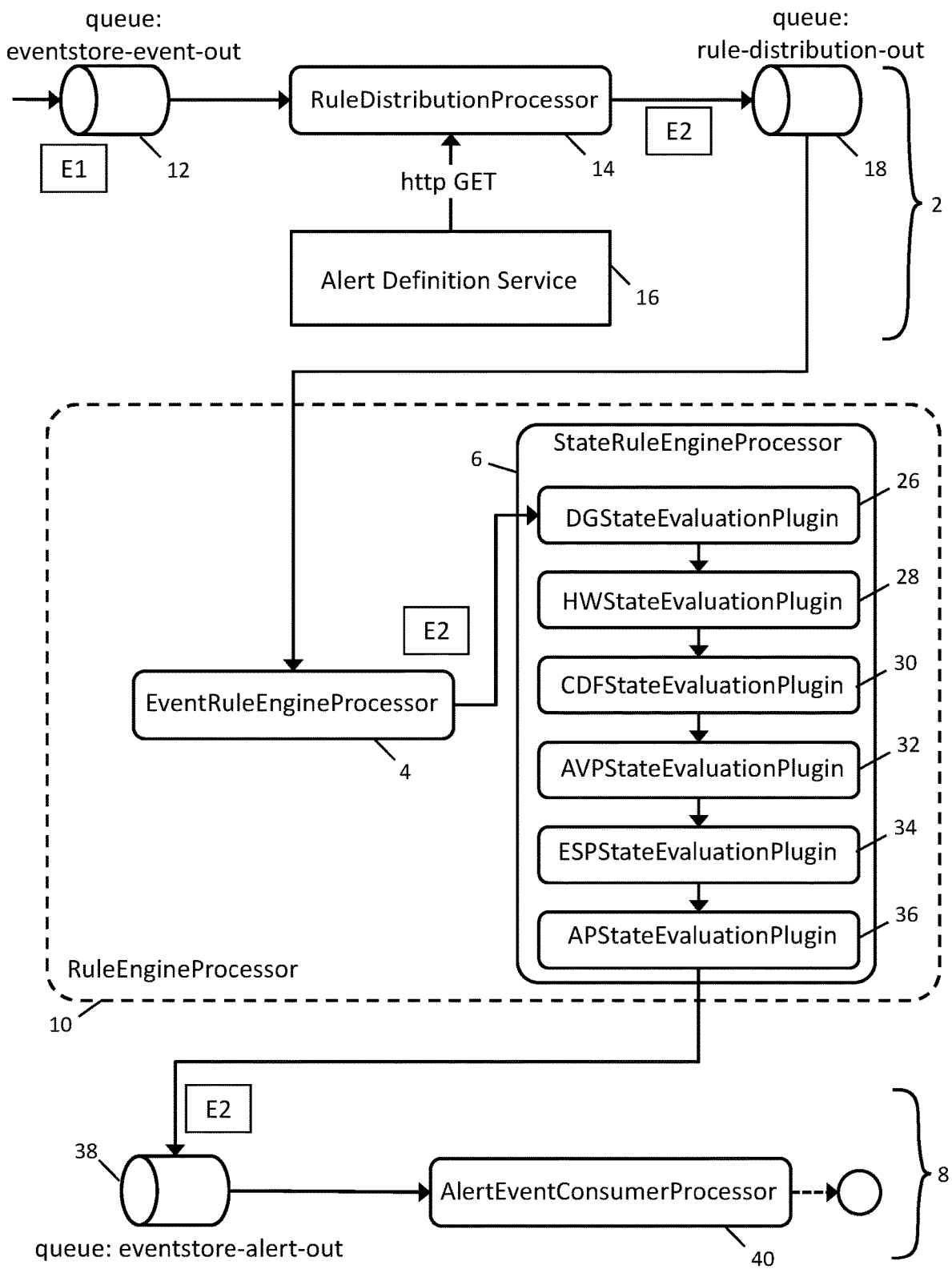
FIG. 1 represents a schematic diagram of the alert engine pipeline, according to an embodiment of the present invention.

Domain entities—refer to the different classes of entities. For example, the following are all domain entities: device, system, network-adapter, user interface events, geolocation module, anti-malware event domain, encryption domains, application persistence, etc.

Endpoint, or device: This is any electronic device, including any computing device. A device is a domain entity and may include multiple constituent domain entities. Non-limiting examples of a device include a laptop, cell phone, personal digital assistant, smart phone, memory stick, personal media device, gaming device, personal computer, tablet computer, electronic book, camera with a network interface, and netbook. Most devices protected by the invention will be mobile devices, but static devices, such as desktop computers, projectors, televisions, photocopiers and household appliances may also be protected. Many other kinds of electronic devices may be included, such as hi-fi equipment, cameras, bicycles, cars, barbecues and toys, if they include memory and a processor. Devices are configured to communicate with a remote server, and they may initiate the communications and/or the communications may be initiated by the server. Communications may be via Wi-Fi™, SMS, cellular data or satellite, for example, or may use another communications protocol.

Event—This is something that occurs in relation to an endpoint. It may be internal to the endpoint, external to the endpoint, an interaction with the endpoint, etc. For example, the following are all events that derive from different domain entities: device-system-information change events, device-network-adapter change events, user login events, device-geolocation change events, etc.

Evaluated Event—This refers to a pre-filtered event that has been analyzed in relation to a rule, i.e. as to whether the event satisfies one or more conditions of the rule.

Rule—A rule has one or more conditions that must be satisfied in order to invoke one or more actions of the rule. A rule may require only a single condition to be satisfied, by a single event, or it may require multiple conditions to be satisfied by multiple events. The actions may be security actions, for example, or the sending of notifications. In some embodiments, a specific scenario for multiple conditions in a rule occurs when they span different domains, an example being when [geolocation fence exited] and [USB drive created]. The entry or exit events of geofences are from a different domain than [USB drive created], the latter being a hardware event. A rule may be described as having constituent rules, and as such, multiple rule evaluation may be used to refer to multiple event evaluation.

Pre-filtered event—An event that has been compared to a group of rules, where it is determined that the event corresponds to one or more of the rules. In other words, it is an event that is eligible to be assessed by one of the rules. As a pre-filtered event, it is not at this point evaluated as to whether it satisfies the rule or not, or a condition of the rule. If the event does not correspond to any of the rules, then it is discarded, and removed from the queue for evaluation.

System—unless otherwise qualified or clear from the context, this refers to the system of the present invention, in particular a system that detects whether two or more events, occurring within a fixed period of time, are relevant to one or more conditions of a common rule. Such events are recorded in an electronic document ("document" for brevity) with a reference to the rule, and other events are discarded. Documents may be recorded, for example, in a database, such as a MongoDB database. When all the events are evaluated against the rule, an alert may or may not be triggered depending on the result, and the document is then discarded. Application of the rule may also depend on the state of the endpoint. If the fixed period of time expires before occurrence of the final event necessary for evaluating the group of events, or completing the evaluation of the group of events, then the document is deleted. The system may also evaluate single events that have been pre-filtered.

Tenant—a customer within the system, identified by a customer accountUid, for example.

Topic—a unique label that is assigned to a type of message source. For example, the device hardware service may publish a system-information change event if the deviceName changes. The target of the published message would be a label for such type of message. In this way, a topic is like a mailbox address. One or more services can subscribe to a particular topic to receive the published messages.

B. Exemplary Embodiment

FIG. 1 provides an overview of the alert engine evaluation pipeline, the primary components of which are a pre-filtering rule distribution stage 2, an engine event stage 4 (which may include a single events evaluator, a multiple events evaluator, or both), an engine state stage 6 (state evaluator) and an outcome consumer stage 8 (or triggered alert consumer processor).

The core features of the invention are an event pre-filtering module (rule distribution processor 14) and a module 4 for evaluation of multiple events in a period of time. Optionally included is a module 6 for state evaluation. The module 4 for evaluation of multiple events and the module 6 for state evaluation may be considered to be a more general rule engine processor 10. Also needed is a module 8 for taking security actions based on the evaluation of the events.

E1 and E2 are labels used to indicate that the documents on the queues are not the same, so the output queue of the rule distribution process 14 produces a different message type to the messages that are input to it. In brief, the output messages are filtered, whereas the input messages are not filtered. Here, a document refers to the structure that encapsulates the event data. It is sent from the features using binary form, deserialized in the EventStore events processor and then saved in the document database. It is then forwarded to the topic and alerts distribution processor uses.

B1. Pre-Filtering Rule Distribution Stage

The rule distribution stage 2 pre-filters events by removing events from the event evaluation pipeline before they are dispatched to the rule processing stage 4. This is done because rule engine evaluation of events is more expensive than event filtering. It allows rule processing instances to be preserved for events that are relevant, and contributes to better scaling. A specific account for a tenant may have rules that are relevant to 30% of the events emitted from the events processor. The rule distributor will therefore exclude 70% of the events from being evaluated at the rule engine stage.

The pre-filtering rule distribution stage 2 shown in FIG. 1 includes an event pre-filtering module 14 and its associated inputs and outputs. The event pre-filtering module 14 is labelled RuleDistributionProcessor. It takes as one of its inputs a queue of events 12, labelled eventstore-event-out. The incoming event source may be from an events processor or a topic, for example, or from multiple constituent event sources.

The other input is a collection of rules 16, labelled Alert Definition Service. The output of the pre-filtering module 14 is a series of event-rule tuples that are to be evaluated, shown as a pre-filtered event output queue 18 labelled rule-distribution-out. The number of events in the output queue may be, for example, a significantly small fraction of the number of events in the input queue, such as 30%.

Eventstore-events-in: This may be a subscriber queue to receive messages that different domain features publish their events to under a specific topic. Note that eventstore-event-in is not shown in the diagram, as it may be a queue stage for the events processor upstream of the queue of events 12. The alerts flow begins when events are emitted from the event processor into the eventstore-event-out queue 12. The flow diagram also does not show the events processor in the diagram.

As an example of an event, a changed field or property is one that is identified as changed for that event. If a device-Name changes between the last scan and the current scan of an endpoint, a system-information change event will be generated. The source of the domain events are the service features that are responsible for generating such events. For example, system-information change events are generated by a device-hardware service. There are different services for different domains.

The incoming event source may be from a topic, but the system does not rely on it to maintain a window of time. Also, in the system, the windows are separated by rule for tenant, which allow for better scaling and longer window intervals.

The pre-filtering module 14 receives the events and determines what types of rules in the customer account are suitable for evaluating the events. The rule types are identified in the event. For example, a device event such as a system-information change event can only be evaluated against device rules, i.e. rules that are labeled with the type "Device". The act of processing separates rules and the rule tracking by user account ID (accountUid). This is necessary as customers will create their own rules and so there will be a different number and different types of rules from customer to customer. Note that accountUid may also be referred to as the tenant ID.

If matching rule types are found for the events, then an AlertEvent message containing the event and the matching rule are sent to the topic of the pre-filtered event output queue 18 for each rule that matches that event. As multiple different rules may have the same rule type, a given event may be matched multiple times, each with a different rule. In other cases, the rule type may be unique to a rule, so the type defines only one rule. In this case, the event will be matched with a specific rule.

Rule distribution is the pre-evaluation of events/rules so that only relevant event/rule tuples are dispatched for actual alert engine evaluation. It ensures that the engine is not servicing event/rule pairs that are not relevant. Each event and rule have an entityObjectType property that identifies the relevant domain entity. One criteria the rule distributor 2 uses is to pair only events with rules with same objectEntityType. If no pairing can be made for an event, then that event will not advance to the alert evaluation engine stage 4. An example event would be a system-information change event. This is a "Device" event and the objectEntityType is "Device". So, if a rule is created for the system-information change class of fields where deviceName changed, the rule definition would identify the objectEntityType that it applies to as "Device". As both the event and the rule are labeled the same, then the event will be dispatched for evaluation.

B2. Engine Event Stage

The engine event stage 4 is labelled EventRuleEngineProcessor in FIG. 1. It includes a single events evaluator and a multiple events evaluator. The engine event stage 4 subscribes to the pre-filtered event output queue 18. It is the main evaluation engine that evaluates (i) group filtering, (ii) single events and (iii) multiple events in a given period of time. Group filtering is different from (ii) and (iii), in that the latter two represent alerting to changes in an event, while group filtering allows filtering of data that might be more static. For example, an alert rule could be created that triggers upon devices leaving a geofence. In addition to this, the rule could be augmented by (i) to trigger for devices leaving a geofence that are windows devices or belong to a specific department. So, if we created a rule to check for devices leaving a geofence, but we only want to check those from the finance department, the group filtering would be used for the department filtering.

Figure 2A:
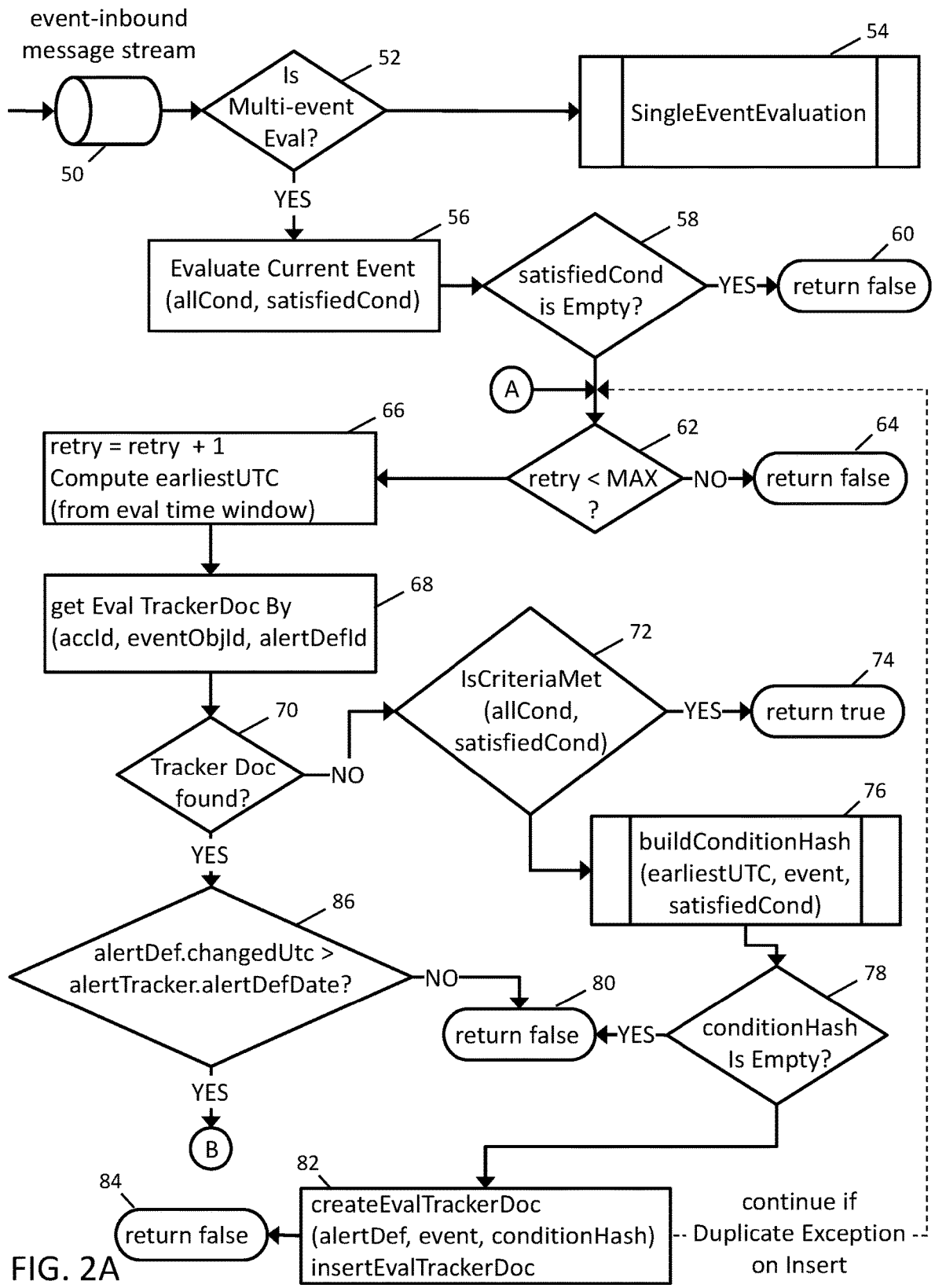
FIGS. 2A-B represent a flowchart for multiple event evaluation, according to an embodiment of the present invention.

The single events evaluator 54 is shown as a box in FIG. 2A, which is processed if the preceding decision point 52 determines that the particular event in the stream of events is not to be evaluated in combination with another event.

Figure 2B:
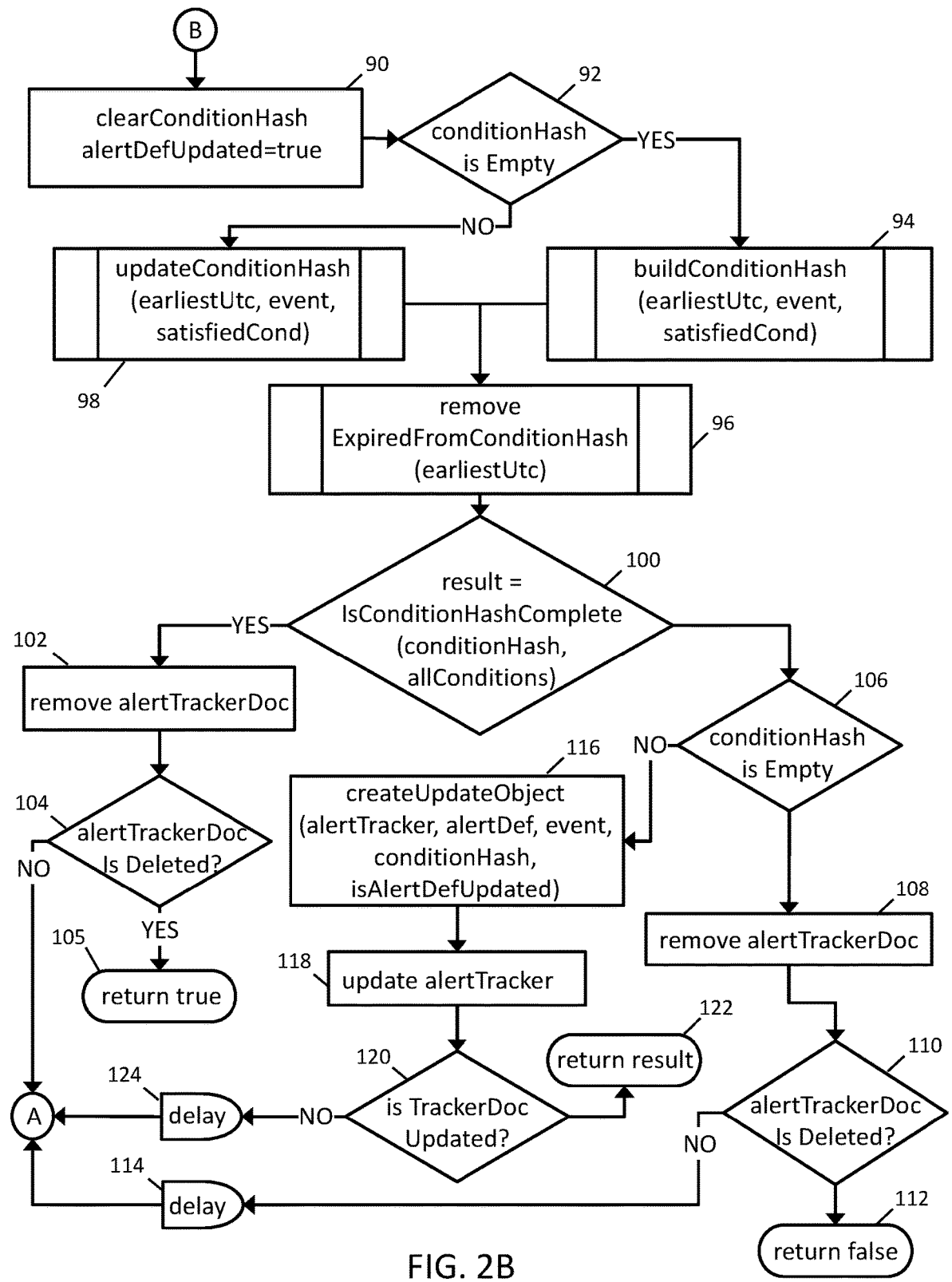

The multiple events evaluator is shown in detail in the flowchart depicted in FIGS. 2A-B. This flowchart provides an account of the core processes that are executed specifically for determining whether a stream of events evaluated against a multi-domain ruleset within a specified time interval will result in a triggered alert. A multi-domain ruleset is a set of rules that combine conditions from different event types. For example: deviceName changed and device geolocation Exited combines hardware attributes and device location attributes that are generated by different events from different feature domains.

In a multiple event evaluation in a period of time, we should avoid the problem of a specific candidate event being delayed, due to late arrival, in an overburdened inbound queue to the alert evaluation engine stage 4. If not avoided, this can result in expiration of the window of evaluation with an outcome that there is not a match for the multiple events evaluation in the time period. The mitigation strategy for this is to ensure that the engine stage 4 can sufficiently scale to drain the inbound, pre-filtered event output queue 18 sufficiently fast.

B3. Engine State Stage

A mechanism is also provided for evaluating static state of endpoints in combination with changed properties.

StateRuleEngineProcessor: if the engine stage 4 (EventRuleEngineProcessor) determines that the event satisfies a condition of a corresponding rule, or that a group of events satisfy multiple conditions in a rule (i.e. group criteria are accepted), further evaluation stages are optionally run depending on whether the rule definition contains state conditions that need to be satisfied. The stages listed in the illustration are for different features within the system, each corresponding to the assessment of a particular state of an endpoint. The system uses a plugin architecture, as over time new feature domains may need to be evaluated against. Plugins for different state evaluation steps include, for example: DG (device groups) 26, HWS (hardware) 28, CDF (custom data field) 30, AVP (anti-virus provider) 32, ESP (encryption service provider) 34, and APS (application persistence) 36.

The events generated generally convey changed information from the prior state, i.e. the last state. However, it is sometimes necessary to evaluate on the current state of some properties in addition to changes that are propagated. For example, a system-information change event shows that that deviceName was changed, however, our rule could be for "deviceName changed AND deviceManufacturer is DELL™" The latter field (deviceManufacturer) is an example of a static field for a device.

B4. Outcome Consumer Stage

AlertEventConsumerProcessor 40: this is part of the final stage and any messages emitted from the StateRuleEngineProcessor stage 6 to the eventstore-alert-out queue 38 are processed here. This provides two principal functions: (i) generation of an alert (e.g. AlertTriggered event) for the event(s) and rule that are saved in the EventStore storage; and (ii) optional execution of one or more of a set of security actions, such as locking the device, reducing functionality of the device, rebooting the device, tracking the device, monitoring use of the device, capturing keyboard entries on the device, capturing screenshots from the device, taking photos or videos with the device's camera, sounding an alarm on the device, displaying a message on the device, deleting data on the device, encrypting data on the device, deleting decryption keys on the device, transferring data from the device, notifying other devices in the vicinity of the device, and sending email notifications to IT administration, security personnel or law enforcement.

C. Multiple Events Evaluator

Referring to FIGS. 2A-B, flowcharts are shown of the processes occurring in the event-rule processor 4 (EventRuleEngineProcessor). An inbound event message stream 50 or queue provides the event messages to the alert engine pipeline. The event messages have been prefiltered by the rule distribution stage 2. At decision point 52, the system determines whether the prefiltered event is to be subjected to multi-event evaluation over a specific time interval, with other prefiltered events, or to a single event evaluation. The system can determine this because each event is labeled with a rule type, which can include whether it is a single event rule or a multi-event rule.

Evaluation 54 is the single event evaluation block. It encapsulates an in-memory (main RAM) evaluation to determine if the current event, now a dequeued event, satisfies the current alert definition condition or conditions in the rule.

Block 56 evaluates the current dequeued event against the set of one or more conditions (i.e. alert definition conditions) in a rule for events that are to be evaluated as a group of multiple events. The current dequeued event may be the first of a set of events that are to be evaluated as a group, or it may be a subsequent event to one or more dequeued events that have been captured and evaluated against one or more conditions of the corresponding rule. In relation to this block, satisfiedCond refers to a list of rule conditions in the alert definition that are satisfied by the incoming event.

At step 58, the event-rule processor 4 determines whether the outcome of the current evaluated event satisfies one of the rule conditions. If the current evaluated event does not satisfy the corresponding condition or conditions of the rule against which it was evaluated, then step 60 returnsfalse to indicate that the fulfilment of the condition is not completed by the current event. That is, when the variable satisfiedCond is Empty, this signifies that the event is not sufficient to satisfy the particular condition or conditions of the rule. The event is then discarded, or allowed to be deleted from the RAM.

However, if the current evaluated step satisfies one of the rule conditions, then satisfiedCond is not Empty and step 58 leads to step 62. Step 62 is a retry step, which is a mitigation strategy to deal with potential concurrent updates. These updates may be, for example, for two events that come in at the same time, or close enough together that one of them is not taken into account when the other is being evaluated. Step 62 allows for a number of retries of the evaluation in step 58 up to a maximum threshold.

In step 62, if the number of concurrency retries reaches the maximum retry threshold, then the evaluation of the dequeued event is failed and the process exited, returning-false in step 64. In step 62, if the number of concurrency retries has not reached the maximum retry threshold, then in step 66, the retry counter is incremented. Also, the time of the earliest event currently in the set that satisfied the condition is determined. As we are dealing with a sliding window of time, then with each trigger of evaluation due to an incoming event, the current time (wall clock time) is used along with the time window interval to compute the new earliest time. If this is the first time step 66 is processed for a specific event, then the earliest event is the specific event. If this is a subsequent time that step 66 is processed, i.e. via circle A (steps 104, 114 or 124), then the tracker document will be available with at least one other event in it, and the earliest event is determined from amongst the one or more events in the tracker document and the specific event.

Next, step 68 attempts to fetch the current tracker record (a document), if any, by account ID, event object ID and rule ID (i.e. alert definition ID), from the tracking database table. The current tracker record has one or more events that relate to the current, dequeued event and corresponding rule, these events having already satisfied one or more conditions of the rule. The tracker record may be one of multiple current tracker records for the incoming event. Step 70 is a branching condition to provide alternate logic depending on whether or not the tracker document is found in step 68.

If, in step 70, the tracker record is not found (in step 68), then step 72 evaluates whether the event satisfies the alert definition in the rule. If the event does satisfy the alert definition when there is no tracker record, step 74 returns true to indicate an alert can be raised. Note that a raised alert is also an event of the type AlertTriggered that is sent to the EventStore as a terminal step. If the event does not satisfy the alert definition when there is no tracker record (a double-check built into the code), step 76 creates a tracker record object and populates it with the appropriate fields. Appropriate fields include, for example, the event, the timestamp of the event, the event type, the rule type, the timestamp of the rule, and the conditions of the rule. Other fields may include, for example, accountUid for customer account identification; entityObjectId, which is similar to the device identification if the alert definition contains conditions for events from devices; objectEntityType, which may be a Device enum value, to indicate that it pertains to a device. There could be others such as User, to indicate user events such as User Created. Still other fields may be alertDefinitionId, which is the identification of the alert definition containing the rules; alertDefinitionDate; latestDate; lastUpdated; expAt for the computed time when the document should expire if it is not removed during the evaluation step; conditionHash, which is a map between the satisfied conditions and the event instances that satisfy them it (Map <String, Event>).

For each condition in the rule that the current event satisfies, the current event is inserted into the conditionHash of the tracker document. The conditionHash is a field in the tracker document which stores a hash of the conditions of the rule and whether they have been satisfied or not. It need not be a hash, and other representations may be used. An event may be inserted multiple times in the tracker document, with each insertion being associated with a different, satisfied condition of the rule.

In step 78, a check on the tracker document's conditionHash is performed. If it is Empty (a double-check that is unlikely to be executed), it means that the current event does not satisfy the condition of the rule or fall within the desired timeframe, and therefore the new tracker document should not be inserted into the database. If this is the case (i.e. conditionHash is Empty), then in step 80 the process returnsfalse, i.e. it does not raise an event.

If, however, in step 78, the conditionHash of the tracker document is not Empty, then subsequent incoming events should be tracked for it. In step 82, the process finishes updating any remaining fields of the tracker document, if there are any still left to complete. The process also attempts to insert the tracker document into the database. If inserting the tracker document returns an error, that means another call has already updated that particular tracker document, and the process needs to retry, starting again from step 62. If the tracker document has successfully been inserted, the processing stops here, and step 84 returns false, i.e. the conditionHash is not Empty, a tracker document is inserted into the database without errors, and an alert is not raised.

Returning to step 70, if a pre-existing tracker document exists (e.g. called alertEvalTracker), then in step 86, the last-changed timestamp of the incoming alert definition (i.e. of the rule associated with the incoming event) is checked and compared with the alert definition date field (alertDefinitionDate) stored in the tracker document. If the incoming alert definition is an older version compared to one we have stored, then the process stops and an alert is not fired. In step 80 the process then returnsfalse. If, in step 86, the incoming alert definition is a newer version compared to the one stored in the tracker document, then the conditionHash is wiped in step 90 and the incoming event is inserted accordingly. Step 86 ensures that the most up-to-date version of the rule is used.

If, in step 86, the timestamps are the same, then conditionHash is not cleared in step 90 and for each condition that the incoming event satisfies the process checks, in step 92, to see if these is already an event stored for that condition in the tracker document's conditionHash. If there is already an event stored, then the timestamps on both events are compared and the more recent one is kept, in step 98. If we do not already have an event stored, then the incoming condition-event combination is stored in the alertEvalTracker's conditionHash, in step 94.

In step 96, outdated events are removed from the tracker document. This is achieved, for example, by letting the time represented by an earliest valid date variable (e.g. earliestValidDate) be equal to the current time in the system minus the desired time frame (i.e. time window) that we are interested in. The desired time may be specified, for example in the tracker document in association with the rule that is stored there. For each event in tracker document's conditionHash, its timestamp is checked. If the timestamp for any event is before the earliest valid date, then that means the event has fallen out of the time frame of interest. The event is now no longer relevant and so its key-value pair (i.e. the event and satisfied condition) is deleted from the conditionHash.

Step 100 evaluates whether all conditions are satisfied for the rule. If all conditions are satisfied, then, in step 102, the alert tracker document is removed. If, in step 104, the tracker document does not get deleted, then the process is repeated from block 62. Otherwise, the process returns true in step 105, ending the evaluation and generating an alert, subject to steps 26-36. By returning true, the process either proceeds to evaluating the state of the endpoint, or if this is not necessary, to generating an alert or security action. This is good candidate for an AlertTriggered event to be generated in the consumer processor.

Returning to step 100, if all the conditions are not satisfied, then in step 106 the process checks whether the condition hash is empty. If the condition hash is empty, the tracker document is removed in step 108. Step 110 is a check to determine whether the tracker document was deleted in step 108. If the tracker document was not removed, then, after a delay at step 114, the process repeats from step 62. If the tracker document was successfully deleted, then step 112 returns false, which is the end of the evaluation. In this case, no alert is generated.

Returning to step 106, if the condition hash is not empty, i.e. it contains the incoming event, then in step 116, the process recomputes and updates the expiration and latest date fields, based on sliding window parameters. The alert tracker document is then updated in step 118. If, as checked for in step 120, the document was successfully updated in step 118, then the process returns the result. The result is either true or false. If, in step 120, document was not updated in step 118, then after a delay in step 124, the process repeats from block 62.

D. Document Expiry

Figure 3:
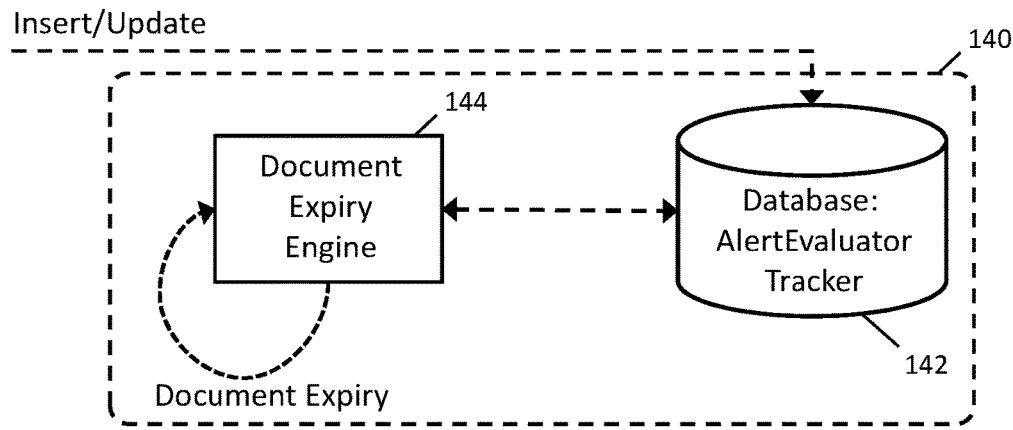
FIG. 3 is a block diagram of alert tracker expiry monitoring, according to an embodiment of the present invention.

The flowcharts in FIGS. 2A-B provide some clean up mechanism (step 102), but it relies on an event to be triggered. If an event is subsequently never received for an alert tracker record that was previously used or created, the alert tracker record will remain in the storage and this can cause tracker storage growth leaking, which can affect indexing and query performance. An automatic clean-up mechanism provides a backup strategy for cleaning up documents that are not being used. FIG. 3 shows an important module 140 of the invention that monitors alert tracker records and expires documents that are no longer eligible for use in an evaluation because the interval of evaluation time has exceeded.

Database 142 (AlertEvaluationTracker) is a persistent storage that acts like a journal of events that are to be evaluated against a set of rules and their expiration details that correspond to a time window. The AlertEvaluationTracker database 142 stores tracking information as documents (e.g. XML documents, or Extended Markup Language) that detail, for a specific account, an event, a rule matching the event, and the window period it is valid for. For example, we may have a multi-rule set defined as (deviceName changed and geolocation exited) within 24 hours. In this case, if deviceName event for the device occurred and geolocation exited event occurred within a 24 hr period, the alert will be fired. The deviceName and geolocation are separate events and there is no guarantee that if one occurs, the other will occur. If a deviceName changed event is received but within 24 hours of that we do not receive a geolocation exited event, the tracking document will be removed (deleted) by the document expiry engine 144. This is necessary for controlling the size of the collection that stores all such tracking documents.

Figure 4:
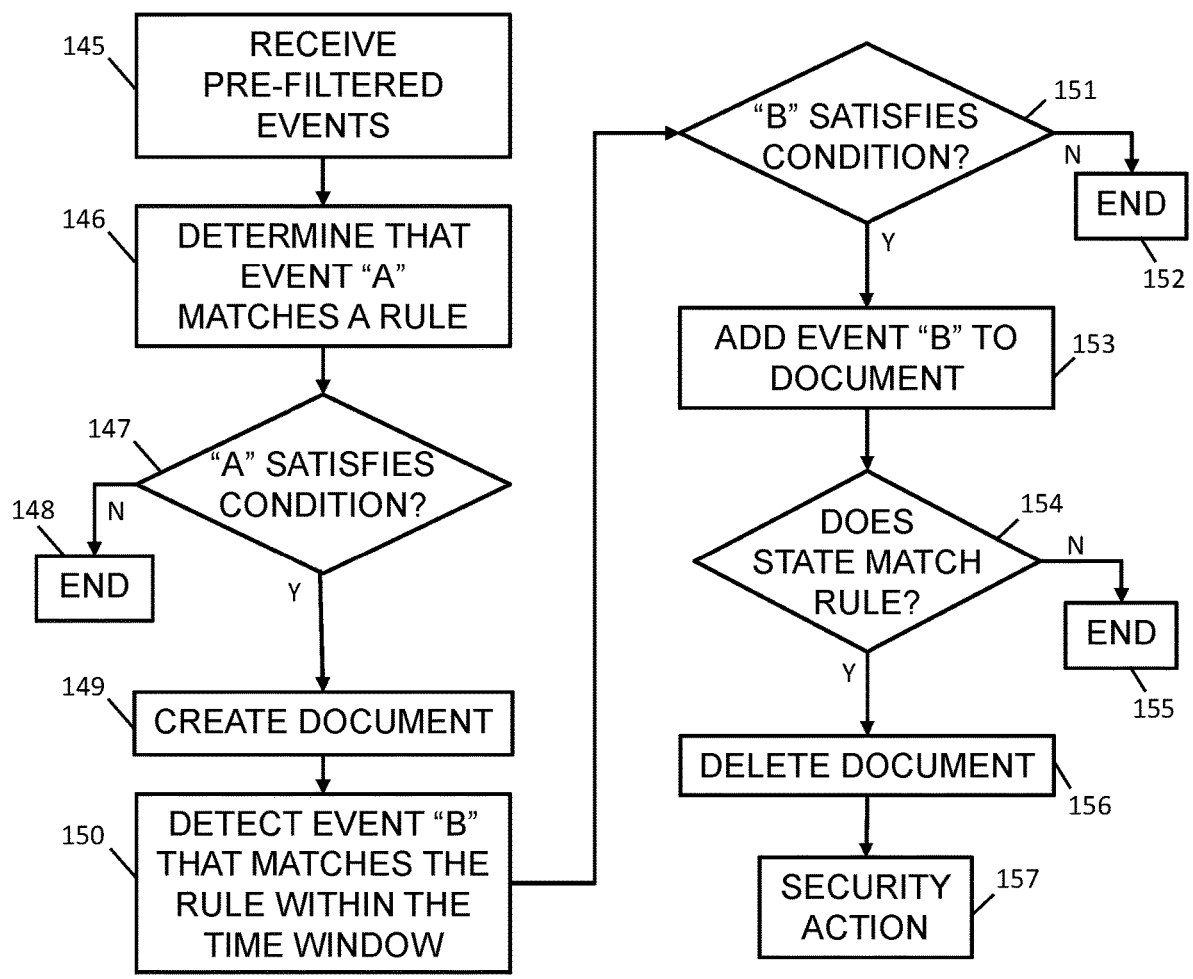
FIG. 4 shows a flowchart of a process according to an embodiment of the present invention.

FIG. 4 shows a simplified flow diagram of an exemplary process of the invention. In step 145, the system receives a stream of pre-filtered events. In this situation, only events that have event types that match rule types are evaluated.

In step 146, the system determines whether an event relating to an electronic device has occurred that has an event type that matches a rule type. For example, the system determines that event A from the stream matches one of the rules. In step 147, the event A is assessed against the portion of the rule to which it corresponds, to determine whether it satisfies a condition of the rule. If not, the process ends at step 148.

If, however, event A satisfies the condition, then in step 149 a document is created that records the event, the matching rule, the condition that is satisfied and an expiry time measured from the occurrence of event A. The matching rule may be stored in whole in the document, only the conditions or requisites of the rule may be stored, or a reference to the rule may be stored. The document serves as a future reference point against later-occurring events.

In step 150, the system determines that event B in the stream has an event type that matches the rule type of the rule that event A matched with. Furthermore, the system detects that event B has occurred within the expiry time stored in the document, i.e. within a predetermined time interval of event A. In step 151, the event B is assessed against the portion of the rule to which it corresponds, to determine whether it satisfies another condition of the rule. If not, the process ends at step 152. If, however, event B satisfies the rule, then event B is added to the document in step 152.

Then, in optional step 154, the state of the electronic device is determined. The state may be defined by two of more constituent states. In some cases, the rule may require the electronic device to have a particular state. If the state does not match or satisfy the rule, then the process stops at step 155. The document is not necessarily deleted at this point as a later event may match the rule when the state of the electronic device has changed.

If, at step 154, the state of the electronic device matches the state required by the rule, or if step 154 is not required, then all conditions of the rule have been satisfied. Optionally, a check may be done to determine whether there are any outstanding conditions that have not yet been met. Since all conditions of the rule have been satisfied, the process proceeds to step 156, in which the document is deleted. Following this, in step 157, the security action of the rule is triggered. The security action taken in step 157 may be the locking of the electronic device, for example. In other cases, the security action may include the sending of a notification to IT security personnel.

D. Block Diagram

The implementation's use of dedicated storage for tracking allows for longer periods over which multiple events may be evaluated, compared to stream window approaches. Stream window approaches are those in which events remain in the queue until they are dequeued and used by a consumer processor. Typically, with the use of dedicated storage, the periods over which the multiple events can be evaluated are orders of magnitude longer than stream window approaches.

By using dedicated storage, the present rule evaluation system overcomes specific challenges. Notably, the implementation of the evaluation of multiple events in a time window is specifically de-coupled from the queue delivery system. This allows for longer window intervals of time for multiple event evaluation without an impact on the queuing system.

Figure 5:
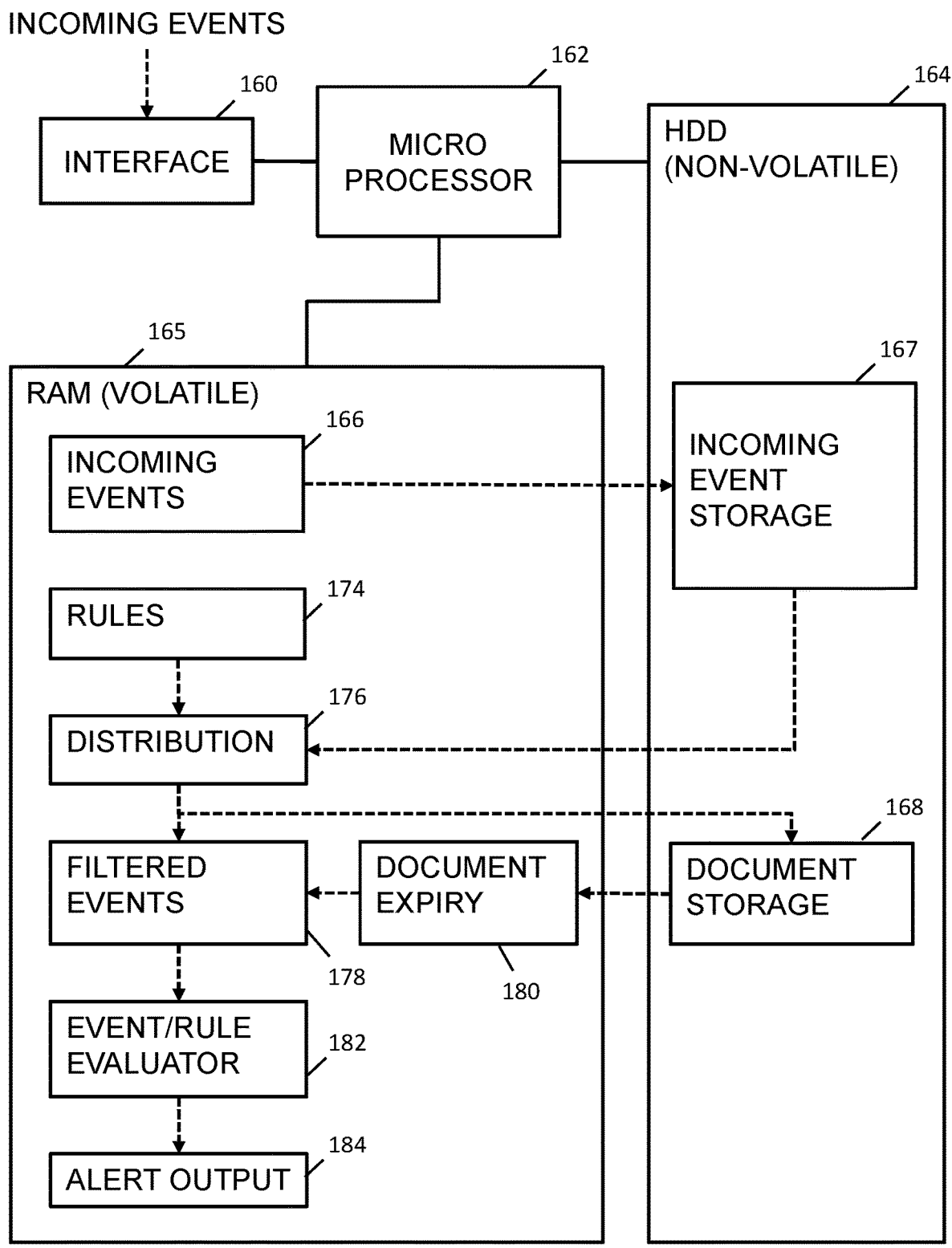
FIG. 5 shows a schematic block diagram of the main modules and physical hardware of the system when it is running, according to an embodiment of the present invention.

FIG. 5 shows a schematic block diagram of the main modules and physical hardware of the system when it is running. Incoming events arrive via an interface 160 that is connected to a microprocessor 162, which is connected to permanent memory 164 and volatile memory 165 (e.g. RAM or main memory). The incoming events 166 are all stored in the incoming event storage module 167 in permanent memory 164, such as a hard disk drive or other long-term non-volatile storage. The rule distribution processor 176 ("Distribution") takes, as inputs, the rules 174 and the stored events 167 from the dedicated storage 164, and outputs the filtered events 178. The filtered events may include single events that should be evaluated by the single event evaluation module 54 (FIG. 2A). The filtered events 178 may also include events that should be evaluated in combination with other events. The output of the distribution 176 may also be a document that is stored in a document store 168 in the persistent storage 164. Documents representing the filtered events are expired by the document expiry module 180 if subsequent events necessary for the rule to trigger an alert do not occur within the time window. The filtered events 178 or groups of filtered events are then processed by an event/rule evaluator module 182 and alerts are output by the alert output module 184 if triggered.

E. Variations

In the current implementation of the multiple events evaluator, it evaluates whether a set of incoming events over a period of time triggers a set of matching rules. An optional variation asks for a minimum threshold for the number of times that a sequence of events is needed to trigger all rules in the ruleset within the time interval.

Additional features may include negation, i.e. being able to create a rule that says "If this event does not occur within this period of time, then . . . ."

More logical operators may be included in the rules. The rules engine has been described in relation to the concatenation of AND, where a rule says "if this event AND that event occur within this period of time, then . . . " However, other logical operators and parenthesis of multiple levels may be included in other embodiments (e.g. OR, NOR, XOR . . . )

The number of events may be incorporated into one or more rules. For example, a rule may say, "If this event occurs 5 times within 2 days AND this event occurs within 7 days, then . . . ."

Rules may be written that incorporate logic on actions. In the basic embodiment, if a rule triggers it triggers all actions associated with it. An alternate embodiment would be to be able to trigger actions depending on logical conditions that evaluate against the current state of the system or the events that happened that are relevant to the rule.

Other multiple event algorithms may be implemented.

The system described herein may be implemented as part of a console that manages endpoints.

Where a processor has been described, it may include two or more constituent processors. Computer readable memories may be divided into multiple constituent memories, of the same or a different type. Steps in the flowcharts and other diagrams may be performed in a different order, steps may be eliminated or additional steps may be included. Numbers and percentage values given are exemplary, and other numbers and percentages may be appropriate for other embodiments.

Unless otherwise indicated, embodiments described as having singular elements may be configured with the same elements in the plural and vice versa.

The detailed descriptions within are presented largely in terms of methods or processes, symbolic representations of operations, functionalities and features of the invention. These method descriptions and representations are the means used by those skilled in the art to most effectively convey the substance of their work to others skilled in the art. A software implemented method or process is here, and generally, conceived to be a self-consistent sequence of steps leading to a desired result. These steps involve physical manipulations of physical quantities. Often, but not necessarily, these quantities take the form of electrical or magnetic signals capable of being stored, transferred, combined, compared, and otherwise manipulated. It will be further appreciated that the line between hardware, software and firmware is not always sharp, it being understood by those skilled in the art that software implemented processes may be embodied in hardware, firmware, or software, in the form of coded instructions such as in microcode and/or in stored programming instructions. Computer readable memory or media described herein are all non-transitory in that they store computer readable instructions and/or computer readable data either permanently or temporarily. A medium that can only support a propagating signal without storing it is considered to be transitory.

The description is made for the purpose of illustrating the general principles of the subject matter and is not to be taken in a limiting sense. The subject matter can find utility in a variety of implementations without departing from the scope of the claims, as will be apparent to those of skill in the art from an understanding of the principles that underlie the subject matter.

The invention claimed is:

1. A method for evaluating events related to an electronic device, the method comprising:
   receiving a stream of pre-filtered events each of which is matched with a corresponding rule;
   determining that a first of the events satisfies a condition of its corresponding rule;
   creating a document that includes said first event, an indication of its corresponding rule, and an expiry time measured from said first event;
   storing the document in a non-volatile storage;
   determining that a second of the events satisfies another condition of the rule corresponding to said first event before the expiry time;
   adding said second event to the document and an indication that said other condition is satisfied; and
   taking a security action in relation to the electronic device.

2. A method for evaluating events related to an electronic device, the method comprising:
   analyzing a stream of pre-filtered events until a first of said events satisfies a condition of a rule corresponding to said first event;
   creating a document that includes said first event, an identification of the rule, and an expiry time defined in the rule and measured from said first event;
   storing the document in a non-volatile storage;
   continuing to analyze said events until either (a) a second of the events satisfies another condition of the rule before the expiry time or (b) the expiry time has passed;
   in the case of (a), adding said second event to the document and an indication that said other condition is satisfied, taking a security action in relation to the electronic device, and deleting the document;
   in the case of (b), deleting the document and repeating the method with subsequent pre-filtered events.

* * * * *